United States Patent Office 2,739,100
Patented Mar. 20, 1956

2,739,100

EXTRACTION OF VITAMIN $B_{12}$ FROM AQUEOUS CONCENTRATES THEREOF

Jerry Robert D. McCormick, New City, N. Y., and Siegfried A. Muller, Westwood, N. J., assignors to American Cyanamid Company, New York, N. Y., a corporation of Maine No Drawing. Application February 23, 1952, Serial No. 273,152

12 Claims. (Cl. 167—81)

This invention relates to the purification and recovery of vitamin materials and, more particularly, to the purification and recovery of vitamin B12 materials from aqueous solutions of the same by liquid-liquid extraction with organic solvents.

The utility of vitamin B12 materials in the treatment of certain anemias is now well established. Vitamin B12 materials such as vitamin B12 and vitamin B12$b$, occur in nature in a very impure state or, in other words the vitamin materials are contaminated with vast quantities of impurities; and before the vitamin B12 material can be utilized, it is always necessary to separate and purify the vitamin material. In such purification and recovery procedures, it is often necessary to extract, or otherwise obtain, the vitamin materials from an aqueous solution. For instance, vitamin B12 material occurs in fermentation "beers" which have supported the growth of various micoorganisms such as *Streptomyces olivacious*, *Streptomyces aureofaciens* and *Streptomyces rimosus*; and it is necessary that the vitamin B12 be recovered from these aqueous sources by separating the same from the aqueous solvent and the vast amount of other materials naturally present therein. In addition to the recovery of vitamin B12 from naturally occurring sources, it is often necessary to recover vitamin B12 from aqueous solutions prepared at an intermediate stage of purification. For instance, where the vitamin B12 materials are adsorbed upon an adsorbent substance, it is not uncommon to prepare an aqueous solution by elution of the vitamin B12 materials from such adsorbent. It can, therefore, be seen that an efficient process of recovering vitamin B12 materials from an impure aqueous solution, whereby said vitamin material is recovered and purified in one operation, would be of great value. The present invention is concerned with a new and efficient method for recovering in purified form vitamin B12 materials, such as B12 and B12$b$, from aqueous solutions of the same.

Several methods have been employed to some extent for recovering vitamin B12 materials from aqueous solutions. One such method, which has received considerable attention, comprises adsorbing the vitamin B12 from an aqueous solution of the same upon an adsorbent material such as charcoal or adsorbent magnesium silicate. Such a method suffers from several disadvantages, including the necessary use of large amounts of expensive adsorbent material; and also the necessary use of large amounts of expensive equipment. A second method, which has been employed to some extent, comprises selectively extracting the vitamin B12 material from the aqueous solution with an organic solvent for the vitamin B12 substance. In order for such a method to be a success, a solvent must be employed which, under the circumstances, has a high distribution coefficient for the vitamin B12 material with regard to water. This means that when a solution of aqueous vitamin B12 material is in equilibrium with the organic solvent, the concentration of vitamin material in the aqueous phase must be low relative to the concentration of vitamin material in the organic phase. Unless the solvent employed has this characteristic, recovery is low and a large amount of the vitamin material is lost.

Until the present invention, liquid-liquid extraction of an aqueous solution of vitamin B12 materials has enjoyed only a limited degree of success because of the absence of a readily-available, inexpensive organic solvent having a high distribution coefficient for vitamin B12 material with regard to water. Some success has been achieved with relatively complex and expensive solvents, such as the chlorinated phenols, but the excessive expense and undesirable handling properties of such solvents has limited their use. Even though it is possible to recover a large percent of the solvent in some instances, there is still a loss and, therefore, the need for a process employing simple and inexpensive solvents has been great. The new process of this invention overcomes the above difficulties and allows liquid-liquid extraction of an aqueous solution of vitamin B12 materials with a relatively high degree of recovery and yet with inexpensive, readily-available, simple solvents.

According to the new process of this invention, an aqueous solution of vitamin B12 material is extracted by liquid-liquid extraction by bringing said aqueous solution containing from about 3–20% of an organic acid selected from the group consisting of dichloroacetic acid and trichloroacetic acid, into interfacial contact with a water or brine-immiscible liquid organic solvent selected from the group consisting of lower aliphatic halogenated hydrocarbons, lower aliphatic ketones, lower aliphatic esters and lower aliphatic alcohols. Specific examples of organic solvents of the above type may be illustrated by the following: ethylene dichloride, chloroform, methyl iso-butyl ketone, ethyl acetate, t-amyl alcohol and butanol. It will be noticed that most of the above solvents are compounds which are ordinarily stated to have no extractive power for vitamin B12 materials. It has been reported that solvents such as butanol and tertiary amyl alcohol will extract a small quantity of B12 from an aqueous solution thereof at a very low pH, effected by the use of mineral acids, but this phenomenon is not comparable to the almost complete recovery obtained by the new process of this invention.

The results obtainable by the new process of this invention are excellent. By the addition of the chlorinated acid, the distribution coefficient of the common solvents of the type listed above is raised to such a phenomenal extent that the degree of recovery is exceptionally high and, in fact, recoveries of vitamin B12 material as high as 95% are not uncommon. Since the process is a liquid-liquid extraction method, a relatively high degree of purification is also obtained. This is because most of the impurities encountered in B12 purification are water-soluble and the addition of the chlorinated acid to the aqueous phase does not increase the distribution coefficient of the impurities with respect to the organic solvent in the same manner that the distribution coefficient for vitamin B12 material is raised. This means that while the organic solvent will now extract most of the B12 materials, the impurities which would not ordinarily be extracted are still left in the aqueous phase.

From the above, it will be seen that the new process of this invention has many advantages. The new procedure results in an efficient process employing a readily-available, inexpensive solvent. The new process also results in a good recovery with a fair amount of purification in a minimum number of steps. The simplicity of the process also enables its operation with a minimum of expensive equipment.

The volume of organic solvent per volume of aqueous solution which can advantageously be employed may vary within relatively wide limits. For instance, a volume of organic solvent from 0.01–100 times the volume of aqueous solution to be extracted may be employed. Of course, an amount of the organic solvent in excess of its solubility in the aqueous solution must be employed because two phases must be obtained. While the optimum ratio will vary, depending upon a number of variables such as the concentration of vitamin B12 materials in the aqueous solution and the concentration of impurities in the aqueous solution, highly satisfactory results can usually be obtained if .05–1.0 part by volume of organic solvent is employed for each part by volume of aqueous solution to be extracted and this, therefore, constitutes a preferred range.

The new process of this invention may be employed to extract vitamin B12 materials from almost any aqueous solution ordinarily encountered in vitamin B12 purification. This means that the vitamin B12 concentration in the aqueous solution may be varied within exceptionally wide limits with quite satisfactory results. For instance, it has been found possible to extract vitamin B12 solutions having a concentration of vitamin B12 activity up to about 500 gammas per milliliter; and, likewise, concentrations as low as .005 gamma per milliliter can be extracted with satisfactory results. However, for the most advantageous results, concentrations of vitamin B12 activity in the aqueous phase should be from 0.5 to 200 gammas per milliliter if possible.

As has been previously stated, the concentration of chlorinated acid in the aqueous phase may be varied from about 3–20% by weight. The optimum quantity of chlorinated acid to be employed, of course, depends upon the concentration of impurities in the aqueous solution to be extracted and with a high concentration of impurities, a greater quantity of chlorinated acid should be employed. As a general rule, one should also employ a greater amount of acid if dichloroacetic acid is used rather than trichloroacetic acid. Under ordinary conditions of operation, an organic acid concentration in the aqueous phase of from 5–15% by weight gives the most advantageous results.

It is one of the advantages of the new process of this invention that it can be performed over a relatively wide temperature range. For instance, temperatures from about 0–40° C. are satisfactory. Temperatures above about 60° C. should not be employed since vitamin B12 materials show an increasing instability in the presence of trichloroacetic acid and dichloroacetic acid at such temperatures. Ordinarily, one will perform the new processes of this invention at, or about, room temperature for reasons of convenience and, therefore, temperatures in the range of 15–30° C. constitute a preferred operational range.

The hydrogen ion concentration at which the new process can satisfactorily be performed is necessarily somewhat narrow, because of the required presence in the aqueous solution of at least 3% of dichloroacetic or trichloroacetic acid. Since an acid of this type must be present in the aqueous phase, it will be found to be impossible to maintain an operating pH above about pH 2. On the other hand, the operating pH should preferably be maintained above about pH 1, since below this point the vitamin B12 materials are increasingly unstable. This means that the optimum pH range is from pH 1 to pH 2, inclusive.

The time required for extraction will, of course, depend upon a number of variables. For instance, the desired degree of recovery and the type of liquid-liquid extraction performed play a large part in the time required for the extraction. If one is operating on a relatively small scale and employing a batch procedure where the two phases are thoroughly intermixed and then separated by decantation or centrifugation, only a few minutes need be allowed for a relatively complete extraction. On the other hand, if one is operating on a large scale and employing a liquid-liquid extraction procedure such as countercurrent extraction, a longer period should be allowed for relatively complete extraction.

After the desired degree of interfacial contact has been obtained, the aqueous phase is separated from the organic phase and the vitamin B12 material subsequently recovered from the resulting organic solution. The recovery of the vitamin B12 material from the organic solution can be effected in numerous ways. For instance, this recovery can, in most instances, be effected by solvent evaporation in vacuo after neutralization or by dilution of the organic solution with a second organic liquid which is miscible with the organic solvent but which has practically no solvent power for the vitamin B12 materials. Such procedures are well known to those skilled in the art. A more convenient method of recovery comprises simply extracting the separated organic phase with an aqueous solvent. Since most of the trichloroacetic acid or dichloroacetic acid remains in the aqueous phase, the organic solution, once separated, has a very low distribution coefficient for vitamin B12 material with regard to water and an aqueous solvent can be employed to extract a large percentage of the vitamin B12 from the organic solution. If desired, a small amount of a water-insoluble basic salt such as calcium carbonate may be added during the aqueous extraction since by the use of such salts, a large part of the remaining trichloroacetic or dichloroacetic acid in the organic phase is neutralized and a more complete recovery can be obtained. This procedure has the disadvantage that a conventional filtration is necessary to remove the basic salt.

The invention will be more particularly illustrated by the following specific examples, in which all parts are by weight, unless otherwise indicated.

*Example 1*

A sample of partially purified vitamin B12 material, calculated to contain 18 gammas of vitamin B12 activity by assay, was dissolved in 1 milliliter of aqueous solvent. The resulting solution had a pink color due to the presence of vitamin B12 material. To this solution, there was then added ½ milliliter of ethylene dichloride and the two phases thoroughly mixed. The pink color, indicative of vitamin B12 activity, was observed to remain in the aqueous phase. To the mixture of aqueous solvent and ethylene dichloride, there was then added 0.6 milliliter of a 30% solution of trichloroacetic acid and the mixture again shaken. This time the pink color, indicative of vitamin B12 activity, was observed to be very largely in the organic phase. The organic phase was separated and the vitamin B12 material recovered therefrom by dilution with approximately 10 volumes of benzene. The thus-recovered B12 was found to be several times purer than the original source of vitamin B12 material.

This example was repeated several times, except that in place of the ethylene dichloride, there was employed in each instance an equal quantity of one of the following solvents: chloroform, methyl isobutyl ketone, ethyl acetate, tertiary-amyl alcohol and 1-butanol. All of the above solvents were found to give highly satisfactory results.

*Example 2*

5 parts by volume of a crude vitamin B12 solution derived from a *Streptomyces aureofaciens* fermentation and containing about 0.8 gamma of vitamin B12 activity per milliliter was adjusted to pH 1.9 and shaken with 1 part by volume of ethylene dichloride. The organic phase was noted to be tinged with yellow, but was still clear enough to indicate that no appreciable amount of vitamin B12 material had been extracted from the black aqueous phase. 1 part by volume of 5 molar trichloroacetic acid was then added and the mixture again shaken. The organic phase was a definite yellow in color and was found on assay to contain 3.5 gammas of B12 activity per milliliter, while the aqueous phase assayed only 0.01 gamma of B12 activity per milliliter. The vitamin B12 activity was extracted from the organic phase by liquid-liquid extraction with an aqueous solvent and found to be in a much purer state than the starting material.

*Example 3*

Two parts by volume of an aqueous solution, containing about 9 gammas per milliliter of B12 activity, was shaken with 0.5 part by volume of butanol and 0.2 part by volume of aqueous 5 molar trichloroacetic acid. The butanol phase was separated and found by assay to contain 12 gammas of B12 activity per milliliter, while the spent aqueous phase assayed only about 3 gammas of B12 activity per milliliter.

*Example 4*

To 2.5 parts by volume of a pink B12 solution assaying 12 gammas per milliliter of B12 activity and prepared from a partially purified vitamin B12 concentrate, there was added 0.3 part by volume of ethylene dichloride and 0.3 part by volume of dichloroacetic acid. The mixture was then shaken and it was noted that substantially all of the pink color was transferred to the organic phase. The organic phase was separated by decantation and the vitamin B12 activity recovered by liquid-liquid extraction with an aqueous solvent. The vitamin B12 activity thus recovered was found to be in a much purer state than the starting material.

We claim:

1. A method of purifying vitamin B12 material which comprises bringing an aqueous solution of impure vitamin B12 material, said solution containing from about 3–20% by weight of an organic acid selected from the group consisting of trichloroacetic acid and dichloroacetic acid, into interfacial contact with an organic solvent which is immiscible with said aqueous solution, said organic solvent comprising a compound selected from the group consisting of lower chlorinated aliphatic liquid hydrocarbons, lower aliphatic ketones, lower aliphatic esters and lower aliphatic alcohols, separating the organic phase from the aqueous phase and recovering the vitamin B12 material from the resulting organic solution.

2. A method of purifying vitamin B12 material which comprises bringing an impure aqueous solution of said vitamin B12 material, said solution containing from 3–20% by weight of trichloroacetic acid into interfacial contact with an organic solvent comprising a lower chlorinated aliphatic liquid hydrocarbon which is immiscible with said aqueous solution, said interfacial contact being effected at a pH in the aqueous phase of from about pH 1 to pH 2 and at a temperature of from about 0–40° C., separating the organic phase from the aqueous phase and recovering the vitamin B12 material from the resulting organic solution.

3. The method of claim 2 wherein said lower chlorinated hydrocarbon solvent is ethylene dichloride.

4. A method of purifying vitamin B12 material which comprises bringing an impure aqueous solution of said vitamin B12 material, said solution containing from 3–20% by weight of trichloroacetic acid, into interfacial contact with an organic solvent comprising a lower aliphatic ketone which is immiscible with said aqueous solution, said interfacial contact being effected at a pH in the aqueous phase of from about pH 1 to about pH 2 and at a temperature of from about 0–40° C., separating the organic phase from the aqueous phase and recovering the vitamin B12 material from the resulting organic solution.

5. The method of claim 4 wherein said lower aliphatic ketone is methyl isobutyl ketone.

6. A method of purifying vitamin B12 material which comprises bringing an impure aqueous solution of said vitamin B12 material, said solution containing from 3–20% by weight of trichloroacetic acid, into interfacial contact with an organic solvent comprising a lower aliphatic ester which is immiscible with said aqueous solution, said interfacial contact being effected at a pH in the aqueous phase of from about pH 1 to about pH 2 and at a temperature of from about 0–40° C., separating the organic phase from the aqueous phase and recovering the vitamin B12 material from the resulting organic solution.

7. The method of claim 6 wherein said lower aliphatic ester is ethyl acetate.

8. A method of purifying vitamin B12 material which comprises bringing an impure aqueous solution of said vitamin B12 material, said solution containing from 3–20% by weight of trichloroacetic acid, into interfacial contact with an organic solvent comprising a lower aliphatic alcohol which is immiscible with said aqueous solution, said interfacial contact being effected at a pH in the aqueous phase of from about pH 1 to about pH 2 and at a temperature of from about 0–40° C., separating the organic phase from the aqueous phase and recovering the vitamin B12 material from the resulting organic solution.

9. The method of claim 8 wherein said lower aliphatic alcohol is n-butyl alcohol.

10. The method of claim 8 wherein said lower aliphatic alcohol is t-amyl alcohol.

11. The method which comprises bringing an impure aqueous solution of vitamin B12 material containing from about 0.5 to 200 gammas of vitamin B12 activity per milliliter into interfacial contact with a volume of ethylene dichloride, said aqueous solution of vitamin B12 material containing from 5% to 15% by weight of trichloroacetic acid, said aqueous solution of vitamin B12 material having a temperature of from about 15° C. to 30° C. and a pH of from about pH 1 to pH 2 and said volume of ethylene dichloride being equal to from 5% to 100% of the volume of the aqueous solution of impure vitamin B12 material; separating the organic phase containing vitamin B12 activity, bringing the resulting organic solution of vitamin B12 into interfacial contact with an aqueous solvent and separating the aqueous phase whereby an aqueous solution of purified vitamin B12 material is obtained.

12. The method which comprises bringing an impure aqueous solution of vitamin B12 material containing from about 0.5 to 200 gammas of vitamin B12 activity per milliliter into interfacial contact with a volume of butanol, said aqueous solution of vitamin B12 material containing from 5% to 15% by weight of trichloroacetic acid, said aqueous solution of vitamin B12 material having a temperature of from about 15° C. to 30° C. and a pH of from about pH 1 to pH 2 and said volume of butanol being equal to from 5% to 100% of the volume of the aqueous solution of impure vitamin B12 material; separating the organic phase containing vitamin B12 activity, bringing the resulting organic solution of vitamin B12 material into interfacial contact with an aqueous solvent and separating the aqueous phase whereby an aqueous solution of purified vitamin B12 material is obtained.

References Cited in the file of this patent

UNITED STATES PATENTS 2,530,416    Wolf _____ Nov. 21, 1950

OTHER REFERENCES

Ellis: Journal of Pharmacy and Pharmacology, vol. 1 (1949), pages 60 and 61.

Zucker: Vitamins and Hormones, vol. VIII (1950), pages 8 to 10.